United States Patent
Kim

(10) Patent No.: US 11,695,762 B2
(45) Date of Patent: Jul. 4, 2023

(54) HETEROGENEOUS DEVICE AUTHENTICATION SYSTEM AND HETEROGENEOUS DEVICE AUTHENTICATION METHOD THEREOF

(71) Applicants: HYUNDAI MOTOR COMPANY, Seoul (KR); KIA MOTORS CORPORATION, Seoul (KR)

(72) Inventor: Sung Un Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 319 days.

(21) Appl. No.: 16/809,207

(22) Filed: Mar. 4, 2020

(65) Prior Publication Data
US 2021/0136067 A1 May 6, 2021

(30) Foreign Application Priority Data
Nov. 1, 2019 (KR) .................. 10-2019-0138378

(51) Int. Cl.
*H04L 29/06* (2006.01)
*H04L 9/40* (2022.01)

(52) U.S. Cl.
CPC ...... *H04L 63/0876* (2013.01); *H04L 63/0853* (2013.01); *H04L 63/0861* (2013.01)

(58) Field of Classification Search
None
See application file for complete search history.

(56) References Cited

U.S. PATENT DOCUMENTS

| | | | | |
|---|---|---|---|---|
| 6,119,096 A | * | 9/2000 | Mann | G06Q 10/02 |
| | | | | 705/40 |
| 6,269,405 B1 | * | 7/2001 | Dutcher | G06F 21/41 |
| | | | | 709/248 |

(Continued)

FOREIGN PATENT DOCUMENTS

| JP | 2011107796 | * | 6/2011 |
| JP | 2012133572 | * | 7/2012 |

(Continued)

OTHER PUBLICATIONS

Rieger et al., "Towards usable and reasonable Identity Management in heterogeneous IT infrastructures", 2007 10th IFIP/IEEE International Symposium on Integrated Network Management (pp. 560-574), (Year: 2007).*

(Continued)

*Primary Examiner* — Piotr Poltorak
(74) *Attorney, Agent, or Firm* — Lempia Summerfield Katz LLC

(57) ABSTRACT

A heterogeneous device authentication system and method authenticate heterogeneous devices in various manners according to user environments. The heterogeneous device authentication system includes an authentication information matching device communication-connected with a plurality of heterogeneous devices and configured to match a plurality of user authentication information of different authentication means to the heterogeneous devices. The authentication information matching device includes a controller and a communication unit communication-connected with the heterogeneous devices. The controller: matches user authentication information selected from among the plurality of user authentication information to a device selected from among the heterogeneous devices based on a user input; stores the resulting matching information; and provides user authentication information matched to each of (Continued)

the heterogeneous devices based on the matching information such that the heterogeneous devices perform user authentication.

23 Claims, 8 Drawing Sheets

(56) References Cited

U.S. PATENT DOCUMENTS

| | | | | |
|---|---|---|---|---|
| 9,265,450 | B1* | 2/2016 | Giobbi | G08B 13/2462 |
| 2006/0185004 | A1* | 8/2006 | Song | H04L 63/0815 |
| | | | | 726/8 |
| 2008/0034207 | A1* | 2/2008 | Cam-Winget | H04W 12/068 |
| | | | | 713/163 |
| 2008/0155662 | A1* | 6/2008 | Vykunta | H04L 63/0815 |
| | | | | 726/5 |
| 2009/0204544 | A1* | 8/2009 | Eizenhoefer | G06Q 10/0637 |
| | | | | 705/1.1 |
| 2010/0299716 | A1* | 11/2010 | Rouskov | H04L 63/105 |
| | | | | 726/1 |
| 2015/0244696 | A1* | 8/2015 | Ma | G06F 21/41 |
| | | | | 726/4 |
| 2016/0012412 | A1* | 1/2016 | Scanlon | G06Q 20/40145 |
| | | | | 705/44 |
| 2017/0289140 | A1* | 10/2017 | Cai | H04L 63/10 |
| 2018/0351925 | A1* | 12/2018 | Badri | H04L 63/105 |
| 2021/0342433 | A1* | 11/2021 | Fujita | G06Q 20/3224 |

FOREIGN PATENT DOCUMENTS

| | | | |
|---|---|---|---|
| KR | 1006517173 | * | 12/2003 |
| KR | 20050066052 | * | 6/2005 |
| KR | 20180015914 A | | 2/2018 |

OTHER PUBLICATIONS

Wan et al., "Identity based security for authentication and mobility in future ID oriented networks", 2018 International Conference on Information Networking (ICOIN) (pp. 402-407). (Year: 2018).*

* cited by examiner

HETEROGENEOUS DEVICE AUTHENTICATION SYSTEM AND HETEROGENEOUS DEVICE AUTHENTICATION METHOD THEREOF

This application claims the benefit of and priority to Korean Patent Application No. 10-2019-0138378, filed on Nov. 1, 2019, which is hereby incorporated by reference as if fully set forth herein.

BACKGROUND

Field of the Disclosure

The present disclosure relates to a system for authenticating a plurality of heterogeneous devices. More particularly, the present disclosure relates to a heterogeneous device authentication system which is capable of authenticating heterogeneous devices in various manners according to user environments and a heterogeneous device authentication method thereof.

Discussion of the Related Art

In general, a biometric recognition technique has been widely used in the field of vehicles, as well as in electronic and information technology (IT) fields.

Particularly, a biometric recognition technique in the field of vehicles has the advantage that a user does not need to carry a separate unit such as a vehicle key when biometric information is used for user authentication.

However, to use a biometric authentication function in a vehicle, it is necessary to, in advance, provide a storage in which biometric information of a user is to be stored, and a system configuration capable of reading out the stored information.

In this regard, some systems should have separate registration units because user interfaces for biometric information registration are not constructed therein.

In a variety of application systems including vehicles, in order to gain access authority to a function of a desired one of the systems, a user should register biometric information, and the like in advance. Then, the user should perform biometric authentication with respect to the function.

However, this method is inefficient in terms of cost in that a separate display unit, a separate input unit, and the like should be provided for biometric information registration.

In addition, in devices networked to a vehicle, in order to gain access authority to the devices, a user should perform authority registration individually with respect to the devices, resulting in an inefficient problem that a display unit, an input unit, and the like for registration should be provided in every individual device.

Accordingly, there is, in the future, a need for development of a heterogeneous device authentication system, which is capable of not only authenticating a plurality of heterogeneous devices efficiently, but also authenticating the heterogeneous devices in various manners according to user environments.

SUMMARY

Accordingly, the present disclosure is directed to a heterogeneous device authentication system and a heterogeneous device authentication method thereof that substantially obviate one or more problems due to limitations and disadvantages of the related art.

An object of the present disclosure is to provide a heterogeneous device authentication system and a heterogeneous device authentication method thereof in which user authentication information selected from among a plurality of user authentication information is matched to a device selected from among a plurality of heterogeneous devices. The heterogeneous devices perform user authentication based on the resulting matching information, thereby making it possible not only to authenticate the heterogeneous devices efficiently, but also to authenticate the heterogeneous devices in various manners according to user environments.

Objects of the present disclosure devised to solve the problems are not limited to the aforementioned object, and other unmentioned objects should be clearly understood by those of ordinary skill in the art based on the following detailed description of the present disclosure.

To achieve these objects and other advantages and in accordance with the purpose of the disclosure, as embodied and broadly described herein, a heterogeneous device authentication system includes an authentication information matching device communication-connected with a plurality of heterogeneous devices. The heterogeneous device authentication system is configured to match a plurality of user authentication information of different authentication means to the communication-connected heterogeneous devices. The authentication information matching device includes a communication unit communication-connected with the heterogeneous devices and a controller. The controller is configured for: matching user authentication information selected from among the plurality of user authentication information to a device selected from among the heterogeneous devices based on a user input; storing the resulting matching information; and providing user authentication information matched to each of the heterogeneous devices based on the matching information such that the heterogeneous devices perform user authentication.

In another aspect of the present disclosure, a heterogeneous device authentication method is disclosed for a heterogeneous device authentication system, which includes an authentication information matching device communication-connected with a plurality of heterogeneous devices. The heterogeneous device authentication method includes: receiving a user authentication information matching request signal by the authentication information matching device; providing, by the authentication information matching device, a prestored user authentication information list and a communication-connected device list upon receiving the user authentication information matching request signal; receiving, by the authentication information matching device, a user input for matching between user authentication information selected from the user authentication information list and a device selected from the device list; matching, by the authentication information matching device, the selected user authentication information to the selected device based on the user input upon receiving the user input and storing the resulting matching information; and providing, by the authentication information matching device, user authentication information matched to each of the heterogeneous devices based on the matching information such that the heterogeneous devices perform user authentication.

In another aspect of the present disclosure, a computer-readable recording medium for storing a program for execution of a heterogeneous device authentication method of a heterogeneous device authentication system executes processes included in the heterogeneous device authentication method.

It is to be understood that both the foregoing general description and the following detailed description of the present disclosure are examples and are intended to provide further explanation of the disclosure as claimed.

Further, when an element in the written description and claims is described as being "for" performing or carry out a stated function, step, set of instructions, or the like, the element may also be considered as being "configured to" do so.

BRIEF DESCRIPTION OF THE DRAWINGS

The accompanying drawings are included to provide a further understanding of the disclosure and are incorporated in and constitute a part of this application. The drawings illustrate embodiment(s) of the disclosure and together with the description serve to explain the principle of the disclosure. In the drawings.

DETAILED DESCRIPTION OF THE DISCLOSURE

Figure 1:
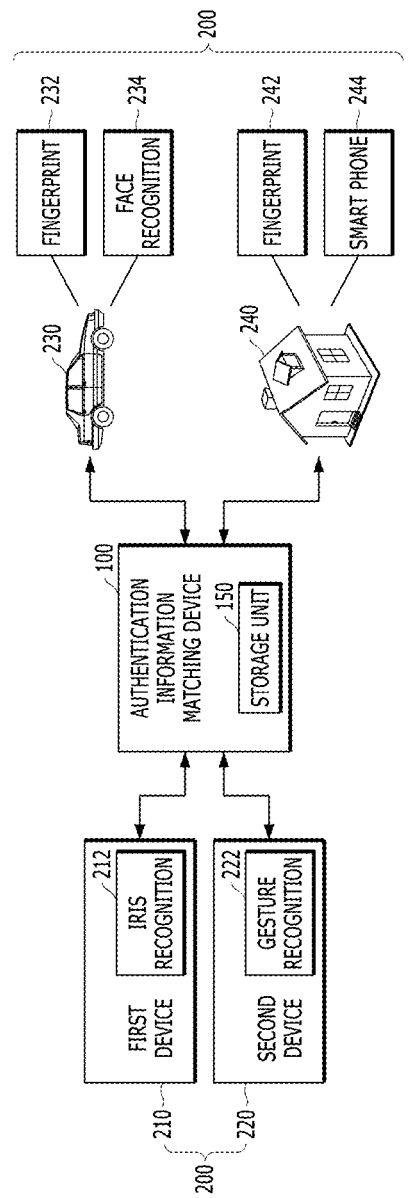
FIG. 1 is a view illustrating a heterogeneous device authentication system according to one embodiment of the present disclosure.

Reference is made below in detail to various embodiments of the present disclosure, examples of which are illustrated in the accompanying drawings. The following embodiments are given by way of example in order to enable those of ordinary skill in the art to fully understand the idea of the present disclosure. Therefore, the present disclosure is not limited by the following embodiments and may be realized in various other forms. In order to clearly describe the present disclosure, parts having no relation to the description of the present disclosure have been omitted from the drawings. Wherever possible, the same reference numerals are used throughout the specification to refer to the same or like parts.

The term "comprises" or "includes" used herein should be interpreted not to exclude other elements but to further include such other elements, unless mentioned otherwise. In addition, the term "unit" or "module" used herein signifies one unit that processes at least one function or operation, and may be realized by hardware, software, or a combination thereof.

Hereinafter, a heterogeneous device authentication system and a heterogeneous device authentication method thereof which may be applied to embodiments of the present disclosure are described in detail with reference to FIGS. 1-12.

FIG. 1 is a view illustrating a heterogeneous device authentication system according to one embodiment of the present disclosure.

As shown in FIG. 1, the heterogeneous device authentication system may include an authentication information matching device 100 which is communication-connected with a plurality of heterogeneous devices 200, which determine whether a user has access authority thereto, based on user authentication information. The heterogenous device authentication system matches a plurality of user authentication information of different authentication means to the communication-connected heterogeneous devices 200. In this example, a communication-connected heterogeneous device 200 may be referred to as a device 200.

In this example, the authentication information matching device 100 may match user authentication information selected from among the plurality of user authentication information to a device 200 selected from among the heterogeneous devices 200 based on a user input. The authentication information device 100 may store the resulting matching information. The authentication information device 100 may provide user authentication information matched to each of the heterogeneous devices 200 based on the matching information such that the heterogeneous devices 200 perform user authentication.

For example, the authentication information matching device 100 may be a mobile terminal including a mobile phone, a smart phone, a laptop computer, a digital broadcast terminal, a personal digital assistant (PDA), a portable multimedia player (PMP), a navigation, a slate personal computer (PC), a tablet PC, an ultrabook, a wearable device (e.g., a smartwatch, a smart glass or a head mounted display (HMD), and the like).

In another example, the authentication information matching device 100 may be applied to a fixed terminal such as a digital TV, a desktop computer or digital signage.

The authentication information matching device 100 may include biometric authentication means and user information authentication means.

For example, the biometric authentication means may extract information of at least one of iris, fingerprint, palm, face, or vein, but is not limited thereto.

The user information authentication means may receive information of at least one of a password, an Internet Personal Identification Number (i-PIN), a resident registration number, or a personal authentication substitute, but is not limited thereto.

Next, upon receiving a user authentication information registration request signal, the authentication information matching device 100 may provide an authentication means list. Then, upon receiving a user input for selection of the authentication means from the authentication means list, the authentication information matching device 100 may provide the selected authentication means and store user authentication information input through the selected authentication means.

In this example, the authentication means list may include a biometric authentication means item and a user information authentication means item.

For example, the biometric authentication means item may include at least one of an iris item, a fingerprint item, a palm item, a face item, or a vein item, but is not limited thereto.

The user information authentication means item may include at least one of a password item, an i-PIN item, a resident registration number item, or a personal authentication substitute item, but is not limited thereto.

Next, upon receiving a user authentication information matching request signal, the authentication information matching device 100 may provide a prestored user authentication information list and a communication-connected device list. In this example, the communication-connected device list may be referred to as the device list. Then, upon receiving a user input for matching between user authentication information selected from the user authentication information list and a device 200 selected from the device list, the authentication information matching device 100 may match the selected user authentication information to the selected device 200 based on the user input and store the resulting matching information.

In this example, when matching the selected user authentication information to the selected device 200, the authentication information matching device 100 may match one user authentication information to one device 200.

In some cases, when matching the selected user authentication information to the selected device 200, the authentication information matching device 100 may match a plurality of user authentication information to one device 200.

In this example, the plurality of user authentication information matched to the one device 200 may be user authentication information registered by different authentication means.

The device list may provide a plurality of device items classified according to types.

In addition, the device list may further provide at least one function item corresponding to each device item.

In this example, when matching the selected user authentication information to the selected device 200, the authentication information matching device 100 may match the user authentication information to the device 200 according to the type of the device 200.

In some cases, when matching the selected user authentication information to the selected device 200, the authentication information matching device 100 may match the user authentication information to the device 200 according to the function of the device 200.

Next, upon receiving a user input for an additional matching condition request when storing the matching information, the authentication information matching device 100 may provide an additional matching condition list. Then, upon receiving a user input for matching between an additional matching condition item included in the additional matching condition list and a device item included in the device list, the authentication information matching device 100 may additionally match an additional matching condition of the additional matching condition item to a device of the device item based on the user input and store the resulting additional matching information.

In this example, the additional matching condition list may include at least one of a time item, i.e., "AM" or "PM", or a place item, i.e., "Seoul", but is not limited thereto.

In addition, when matching the selected user authentication information to the selected device 200 and storing the resulting matching information, the authentication information matching device 100 may encode an image and store the resulting code data, if the user authentication information is the image.

Next, upon matching the selected user authentication information to the selected device 200, the authentication information matching device 100 may transmit the user authentication information to the matched device 200. Then, upon receiving a registration approval signal for the user authentication information from the matched device 200, the authentication information matching device 100 may register the user authentication information.

In this example, when transmitting the user authentication information to the matched device 200, the authentication information matching device 100 may perform a communication connection with the matched device 200. The authentication information matching device 100 may also transmit the user authentication information to the matched device 200 upon being communication-connected with the matched device 200.

For example, the authentication information matching device 100 may perform the communication connection with the matched device 200 based on local-area communication including at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) communication.

Next, upon receiving the user authentication information from the authentication information matching device 100, the matched device 200 may store the user authentication information and transmit the registration approval signal for the user authentication information to the authentication information matching device 100.

In this example, if user information is input, the matched device 200 may perform authentication for the input user information based on the stored user authentication information.

In another case, upon receiving the user authentication information from the authentication information matching device 100, the matched device 200 may transmit the registration approval signal for the user authentication information to the authentication information matching device 100 without storing the user authentication information.

In this example, if user information is input, the matched device 200 may transmit the user information to the authentication information matching device 100 and receive an authentication result for the user information from the authentication information matching device 100.

The embodiment of FIG. 1 with the above-stated configuration is an embodiment which stores input user authentication information and matching information between the user authentication information and a device in a storage unit 150 in the authentication information matching device 100.

In the embodiment of FIG. 1, upon receiving authentication requests from the heterogeneous devices 200, the authentication information matching device 100 may provide user authentication information matched to each of the authentication-requesting devices based on matching information stored in the storage unit 150.

The authentication information matching device 100 may be communication-connected with the plurality of heterogeneous devices 200, such as personal devices such as first and second devices 210 and 220, a vehicle-associated device 230, and a home-associated device 240.

The plurality of heterogeneous devices 200 may have different authentication means.

For example, the authentication means of the first device 210 may be an iris recognition means 212 in which user authentication information is iris information. The authentication means of the second device 220 may be a gesture recognition means 222 in which user authentication information is gesture information. The authentication means of the vehicle-associated device 230 may be a fingerprint recognition means 232 and face recognition means 234 in which user authentication information is fingerprint information and face information. The authentication means of the home-associated device 240 may be a fingerprint recognition means 242 and a smart phone recognition means 244 in which user authentication information is fingerprint information and smart phone information.

Also, as one example, each of the plurality of heterogeneous devices 200 may extract authentication information by executing at least one of iris recognition, fingerprint recognition, palm recognition, face recognition, or vein recognition, but is not limited thereto. Iris recognition is an authentication technology that determines whether a user has access authority. An iris reader analyzes the shape and color of the iris, the shapes of retinal capillaries, and the like, after an iris camera takes a picture of the user's iris and thus captures an image thereof. Fingerprint recognition is an authentication technology that determines whether a user has access authority. A fingerprint reader electronically extracts and stores locations and attributes of feature points of a user's finger having fingerprint projections consisting of bifurcations, ending points, broken points, and the like. The fingerprint reader compares the information with previously input data. Palm recognition is an authentication technology that determines whether a user has access authority. A palm reader senses contact of a palm, captures an image of the palm, filters the obtained palm image data and extracts feature point data. Face recognition is an authentication technology that determines whether a user has access authority. A facial reader distinguishes and extracts a face area from a whole image and determines whether a user has access authority based on the extracted face area. Vein recognition is an authentication technology that determines whether a user has access authority. A vein reader uses patterns of blood vessels of the palm, the back of the hand, the wrist, and the like, which are unique to each individual. Each of the above so-called readers may be any suitable machine, mechanism, or device that is capable of performing the noted function and may include a processor or controller and a camera or other image taking device.

Therefore, the authentication information matching device 100 may match at least one of a plurality of various user authentication information to each of the plurality of heterogeneous devices 200 according to a user environment. The authentication information matching device 100 may provide the user authentication information matched to each of the heterogeneous devices 200 based on the resulting matching information such that the heterogeneous devices 200 perform user authentication.

As stated above, the system of the present disclosure may include all networked devices, such as a personal device, a vehicle-associated device, and a home-associated device.

On the other hand, the authentication information matching device 100 may be a device including a registration unit for authority registration among individual devices, and each of the heterogeneous devices 200 may be a device including only an input unit for only authentication.

Access authority set in an individual device may be reflected in another device over a network.

In addition, the individual device may provide a user authentication information list and a communication-connected device list on a screen. Thus, the individual device may configure networked device authentication authority by matching the same with various elements.

In this example, the various elements may include authentication means, a device type, a time, a place, and the like.

Therefore, a user desiring to use a device may perform authentication according to authentication establishment conditions matched to the device.

Figure 2:
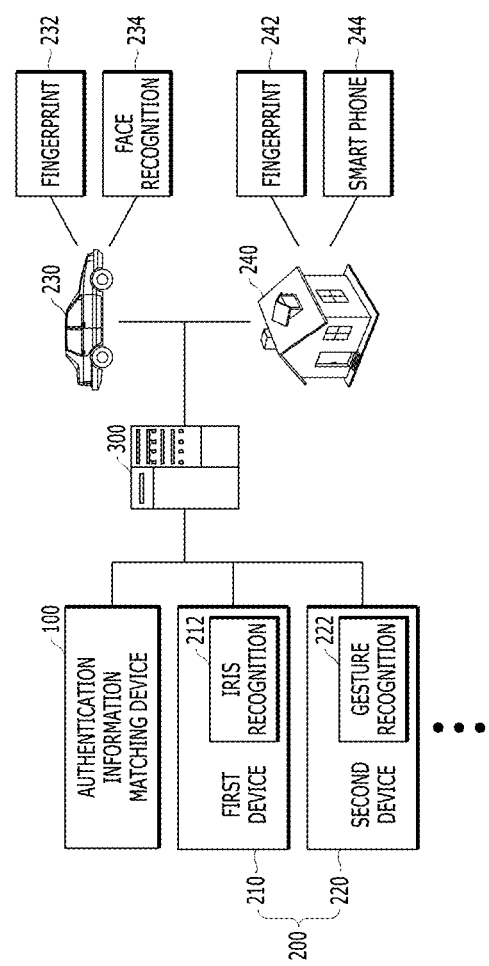
FIG. 2 is a view illustrating a heterogeneous device authentication system according to another embodiment of the present disclosure.

FIG. 2 is a view illustrating a heterogeneous device authentication system according to another embodiment of the present disclosure.

The embodiment of FIG. 2 is an embodiment which stores input user authentication information and matching information between the user authentication information and a device in an external server 300.

In the embodiment of FIG. 2, an authentication information matching device 100 may match user authentication information to a communication-connected device and transmit the resulting matching information to the external server 300 to store the same therein.

Upon receiving authentication requests from a plurality of heterogeneous devices 200, the external server 300 may provide user authentication information matched to each of the authentication-requesting devices based on matching information stored therein.

The external server 300 may be communication-connected with the authentication information matching device 100, and the plurality of heterogeneous devices 200, such as personal devices such as first and second devices 210 and 220, a vehicle-associated device 230, and a home-associated device 240.

The plurality of heterogeneous devices 200 may have different authentication means.

For example, the authentication means of the first device 210 may be an iris recognition means 212 in which user authentication information is iris information. The authentication means of the second device 220 may be a gesture recognition means 222 in which user authentication information is gesture information. The authentication means of the vehicle-associated device 230 may be a fingerprint recognition means 232 and a face recognition means 234 in which user authentication information is fingerprint information and face information. The authentication means of the home-associated device 240 may be a fingerprint recognition means 242 and a smart phone recognition means 244 in which user authentication information is fingerprint information and smart phone information.

Therefore, the authentication information matching device 100 may match at least one of a plurality of various user authentication information to each of the plurality of heterogeneous devices 200 according to a user environment. The authentication matching device 100 may provide the resulting matching information and the user authentication information to the external server 300 such that the heterogeneous devices 200 perform user authentication.

The embodiment of FIG. 2 is the same in configuration as the embodiment of FIG. 1, with the exception that the external server 300 is additionally provided, and a detailed description thereof is thus omitted below.

According to the present disclosure with the above-described configuration, user authentication information selected from among a plurality of user authentication information is matched to a device selected from among a plurality of heterogeneous devices and the heterogeneous devices perform user authentication based on the resulting matching information. Therefore, it may be possible not only to authenticate the heterogeneous devices efficiently, but also to authenticate the heterogeneous devices in various manners according to user environments.

Further, according to the present disclosure, a user may perform authentication according to a given situation through a simple UI manipulation. Therefore, it may be possible to provide security and convenience together.

Figure 3:
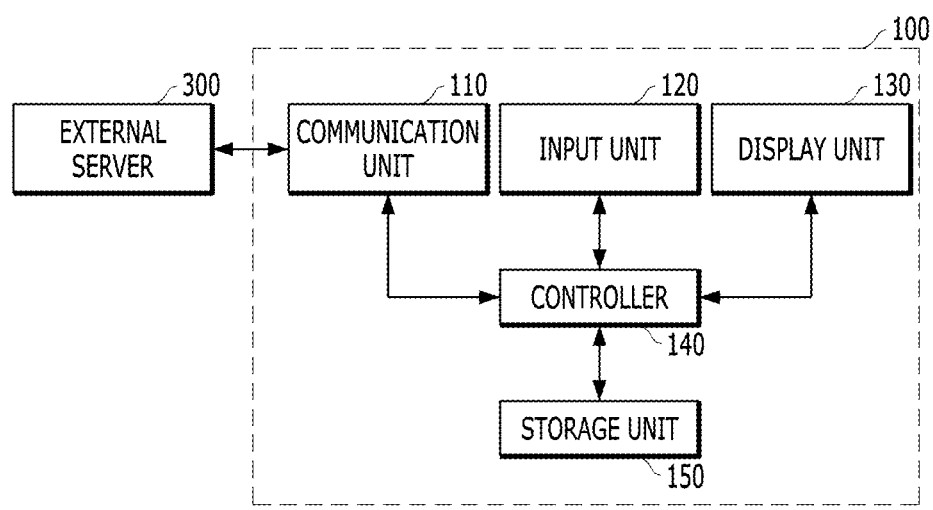
FIG. 3 is a block diagram illustrating an authentication information matching device shown in FIG. 1.

FIG. 3 is a block diagram illustrating the authentication information matching device shown in FIG. 1.

As shown in FIG. 3, the authentication information matching device 100 may include: a communication unit 110 communication-connected with a plurality of heterogeneous devices; an input unit 120 for inputting user authentication information; a display unit 130 for displaying a user authentication information matching window; and a controller 140 for controlling the communication unit 110, the input unit 120 and the display unit 130.

The authentication information matching device 100 may further include a storage unit 150 for storing the user authentication information input from the input unit 120 and matching information between the user authentication information and a device 200.

In some cases, the authentication information matching device 100 may store the user authentication information input from the input unit 120 and matching information between the user authentication information and a device in the external server 300.

The input unit 120 may include biometric authentication means and user information authentication means.

For example, the biometric authentication means may extract information of at least one of iris, fingerprint, palm, face, or vein, but is not limited thereto.

The user information authentication means may receive information of at least one of a password, an Internet Personal Identification Number (i-PIN), a resident registration number, or a personal authentication substitute, but is not limited thereto.

Upon receiving a user authentication information matching request signal, the controller 140 may control the display unit 130 to display the user authentication information matching window. Then, upon receiving a user input for matching between user authentication information and a device from the user authentication information matching window, the controller 140 may match the user authentication information to the device based on the user input. The controller 140 may store the resulting matching information and provide user authentication information matched to each of the heterogeneous devices based on the matching information such that the heterogeneous devices perform user authentication.

In this example, the user authentication information matching window may include a prestored user authentication information list and a communication-connected device list.

For example, the prestored user authentication information list may include: a biometric authentication information item including at least one of iris, fingerprint, palm, face, or vein; and a user information item including at least one of a password, an i-PIN, a resident registration number, or a personal authentication substitute, but is not limited thereto.

The device list may include a plurality of device items classified according to types, and function items of each device item.

In some cases, the user authentication information matching window may further include an additional matching condition list.

In this example, the additional matching condition list may include at least one of a time item or a place item.

When matching the user authentication information to the device, the controller 140 may match one user authentication information to one device based on the user input.

In some cases, when matching the user authentication information to the device, the controller 140 may match a plurality of user authentication information to one device.

In this example, the plurality of user authentication information matched to the one device may be user authentication information registered by different authentication means.

When matching the user authentication information to the device, the controller 140 may match the user authentication information to the device according to the type of the device based on the user input.

In some cases, when matching the user authentication information to the device, the controller 140 may match the user authentication information to the device according to the function of the device based on the user input.

Upon receiving a user input for an additional matching condition request, the controller 140 may additionally provide an additional matching condition list in the user authentication information matching window.

In this example, upon receiving a user input for matching between an additional matching condition item included in the additional matching condition list and a device item included in the device list, the controller 140 may additionally match an additional matching condition of the additional matching condition item to a device of the device item based on the user input and store the resulting additional matching information in the storage unit 150 or the external server 300.

In this example, the additional matching condition list may include at least one of a time item or a place item but is not limited thereto.

In addition, when matching the user authentication information to the device through the user authentication information matching window and storing the resulting matching information, the controller 140 may encode an image and store the resulting code data, if the user authentication information is the image.

Upon matching the user authentication information to the device, the controller 140 may transmit the user authentication information to the matched device. Then, upon receiving a registration approval signal for the user authentication information from the matched device, the controller 140 may register the user authentication information.

In this example, when transmitting the user authentication information to the matched device, the controller 140 may perform a communication connection with the matched device and transmit the user authentication information to the matched device upon being communication-connected with the matched device.

In addition, upon receiving a user authentication information registration request signal, the controller 140 may control the display unit 130 to display an authentication means list window. Then, upon receiving a user input for selection of authentication means from the authentication means list window, the controller 140 may provide the selected authentication means and store user authentication information input through the input unit 120 corresponding to the selected authentication means.

In this example, the authentication means list window may include a biometric authentication means item and a user information authentication means item.

For example, the biometric authentication means item may include at least one of an iris item, a fingerprint item, a palm item, a face item, or a vein item, but is not limited thereto.

The user information authentication means item may include at least one of a password item, an i-PIN item, a resident registration number item, or a personal authentication substitute item, but is not limited thereto.

Figure 4:
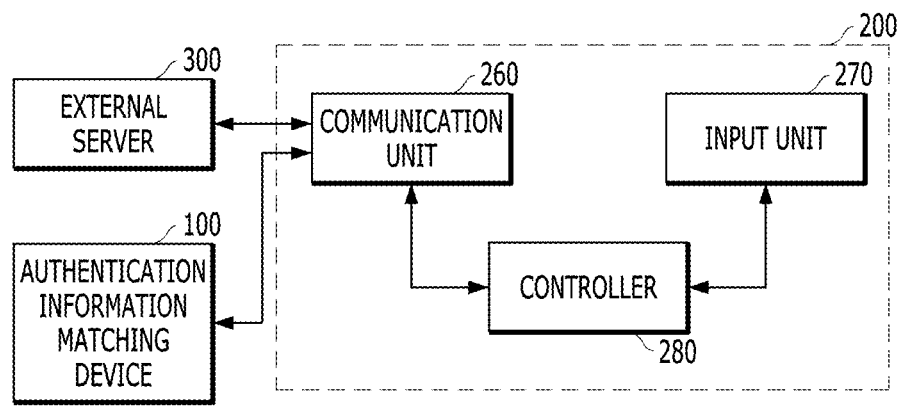
FIG. 4 is a block diagram illustrating heterogeneous devices shown in FIG. 1.

FIG. 4 is a block diagram illustrating the heterogeneous devices in FIG. 1 according to one example.

As shown in FIG. 4, each device 200 may include: a communication unit 260 communication-connected with the authentication information matching device 100; an input unit 270 for inputting user information; and a controller 280 for determining whether a user has access authority to a corresponding one of the devices 200, based on information received from the communication unit 260 and the input unit 270.

In this example, when the user information is input from the input unit 270, the controller 280 may determine whether the user has the access authority to the corresponding device, by authenticating the input user information based on user authentication information received from the authentication information matching device 100.

Each device 200 may further include a storage unit for storing the user authentication information received from the authentication information matching device 100.

In some cases, upon receiving the user authentication information from the authentication information matching device 100, the device 200 may store the user authentication information in the storage unit and transmit a registration approval signal for the user authentication information to the authentication information matching device 100.

In this example, when the user information is input from the input unit 270, the device 200 may authenticate the input user information based on the user authentication information prestored in the storage unit.

In another case, upon receiving the user authentication information from the authentication information matching device 100, the device 200 may transmit the registration approval signal for the user authentication information to the authentication information matching device 100 without storing the user authentication information in the storage unit.

In this example, when the user information is input from the input unit 270, the device 200 may transmit the user information to the authentication information matching device 100 and receive an authentication result for the user information from the authentication information matching device 100.

Figure 5:
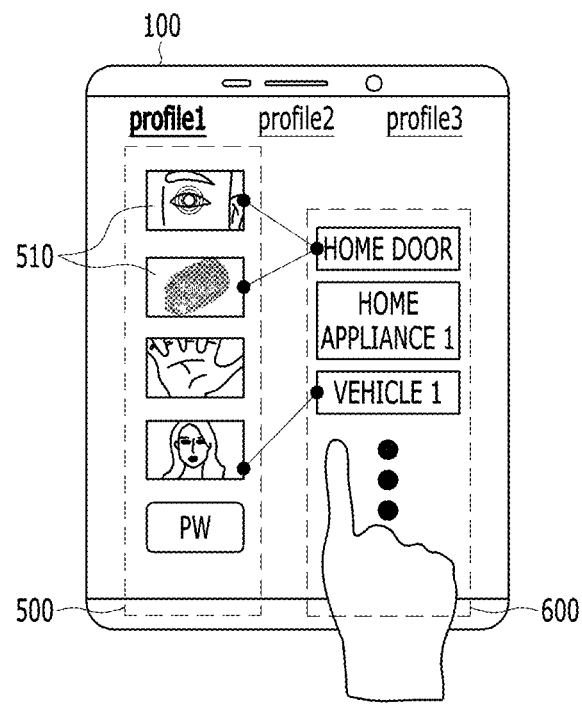
FIGS. 5-7 are views illustrating various schemes for matching between user authentication information and a device according to an embodiment of the present disclosure.
Figure 6:
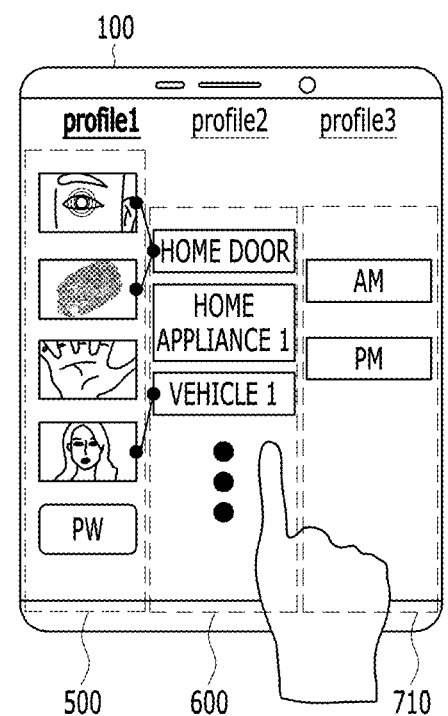
Figure 7:
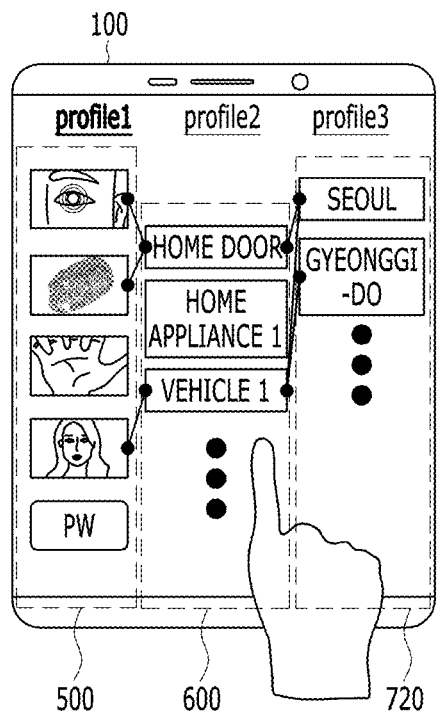

FIGS. 5-7 are views illustrating various schemes for matching user authentication information with a device.

As shown in FIG. 5, upon receiving a user input requesting user authentication information matching, the authentication information matching device 100 may display a user authentication information matching window on a display screen.

In this example, the user authentication information matching window may include a prestored user authentication information list 500 and a communication-connected device list 600.

For example, the prestored user authentication information list 500 may include a biometric authentication information item 510 including at least one of iris, fingerprint, palm, face, or vein, and a user information item (not shown). The user information item may include at least one of a password, an i-PIN, a resident registration number, or a personal authentication substitute.

The communication-connected device list 600 may include a plurality of device items classified according to types, such as a home door, a home appliance and a vehicle.

Then, upon receiving a user input for matching between a biometric authentication information item 510 selected in the user authentication information list 500 and a device item selected in the communication-connected device list 600 from the user authentication information matching window, the authentication information matching device 100 may match user authentication information of the selected biometric authentication information item 510 to a device of the selected device item based on the user input and store the resulting matching information.

In this example, the authentication information matching device 100 may match one user authentication information to one device based on the user input or may match a plurality of user authentication information to one device.

In some cases, the authentication information matching device 100 may provide a user authentication information matching window further including an additional matching condition list, as shown in FIGS. 6 and 7.

In this example, the additional matching condition list may include at least one of a time item 710 in FIG. 6 or a place item 720 in FIG. 7.

Upon receiving a user input for matching between an additional matching condition item included in the additional matching condition list and a device item included in the communication-connected device list, the authentication information matching device 100 may additionally match an additional matching condition of the additional matching condition item to a device of the device item based on the user input and store the resulting additional matching information.

In the case where the time item 710 is included in the additional matching condition list as in FIG. 6, a time of the time item 710 selected based on the user input may be additionally matched to the device.

In this case, because the device performs user authentication according to the matched authentication means condition and time condition, security may be strengthened. In addition, a variety of authentication conditions may be additionally provided according to user environments, thereby making it possible to provide user convenience.

Alternatively, in the case where the place item 720 is included in the additional matching condition list as in FIG. 7, a place of the place item 720 selected based on the user input may be additionally matched to the device.

In this case, because the device performs user authentication according to the matched authentication means condition and place condition, security may be strengthened. In addition, a variety of authentication conditions may be additionally provided according to user environments, thereby making it possible to provide user convenience.

In general, registering biometric information every time through an external device including a vehicle may be a very troublesome process in terms of a user.

In the present disclosure, in order to simplify this process, all biometric information may be stored in an external device or server in a lump and then matched to devices to be authenticated.

Thereafter, an individual device performs only authentication without separate registration, thus providing user convenience.

As needed, matching between biometric information and a device may be registered dividedly according to various situation elements such as schedule/user/position.

In the case where authentication schemes including biometric information are registered according to the above situation elements, an authentication scheme convenient to the current situation of a user, among the authentication schemes, may be employed.

For example, an authentication scheme or plan may be optionally matched to a device such that a password is used rather than a fingerprint in cold weather such as winter.

In addition, in the case where there are personal handicaps, the same biometric authentication scheme may not be applied to devices to be authenticated, but different authentication schemes may be applied individually according to persons.

For example, an authentication scheme may be changed from a fingerprint authentication scheme to a password authentication scheme.

In other words, the authentication information matching device of the present disclosure may match user authentication information to a device based on at least one of device information or current situation information and store the resulting matching information as initial matching information set as a default.

In this example, the device information may include authentication means information about biometric authentication means and user information authentication means by devices.

The situation information may include weather information, time information, and the like.

Therefore, according to the present disclosure, an authentication scheme (e.g., iris>fingerprint>password) providing highest user convenience, among a plurality of authentication schemes, may be set as a default based on at least one of the device information or the situation information and prestored as initial matching information.

For example, a device authentication scheme may be prestored as initial matching information such that a password is used rather than a fingerprint in cold weather.

In addition, according to the present disclosure, future convenience and security may be strengthened by storing personal favorite biometric authentication schemes for device functions.

For example, vehicle start may be authenticated through iris recognition, AVN manipulation may be authenticated through a password, and a container may be authenticated through fingerprint recognition.

Figure 8:
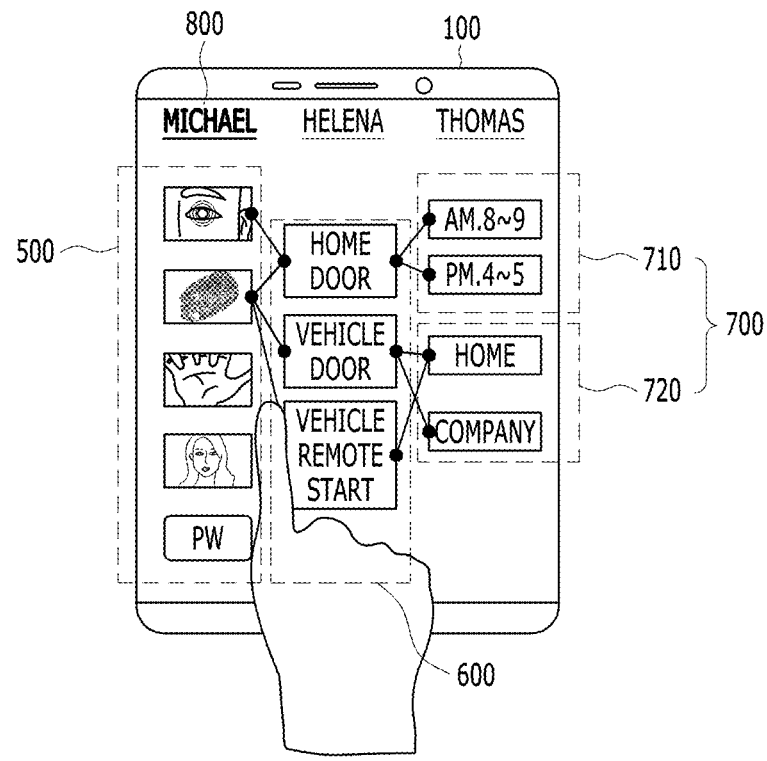
FIG. 8 is a view illustrating an application of matching between user authentication information and a device according to an embodiment of the present disclosure.

FIG. 8 is a view illustrating an embodiment to which matching between user authentication information and a device is applied.

As shown in FIG. 8, the authentication information matching device 100 may provide a user authentication information matching window for each user.

In this example, the user authentication information matching window may include a prestored user authentication information list 500, a communication-connected device list 600, and an additional matching condition list 700.

For example, the prestored user authentication information list 500 may include a biometric authentication information item including at least one of iris, fingerprint, palm, face, or vein, and a user information item (not shown) including at least one of a password, an i-PIN, a resident registration number, or a personal authentication substitute.

The communication-connected device list 600 may include a plurality of device items classified according to types, such as a home door, a home appliance and a vehicle.

The additional matching condition list 700 may include at least one of a time item 710 or a place item 720.

Upon receiving a user input for matching between a device item selected in the communication-connected device list 600 and a user authentication information selected in the user authentication information list 500 and an additional condition information selected in the additional matching condition list 700 from the user authentication information matching window, the authentication information matching device 100 may match the selected user authentication information and the selected additional condition information to a device of the selected device item based on the user input and store the resulting matching information.

For example, as in FIG. 8, a user, Michael, of a user classification item 800 may match a vehicle door open/close authority to a home and a company on a UI of a screen such that the vehicle door open/close authority is given only in the home and in the company. This matching may be performed through fingerprint authentication.

In addition, the user, Michael, may set an authentication authority place element to the home such that a person other than himself cannot remotely start his vehicle.

In addition, the user, Michael, may perform time setting such that home door authority is given only at his office-working time and office-closing time.

In addition, in the case where the user, Michael, intends to let his friend, Thomas, use his vehicle, he may register Thomas's fingerprint such that the door of the vehicle is opened by the registered fingerprint of the user, Thomas.

In addition, the user, Michael, may match a password to vehicle start authority such that the user, Thomas, can start the vehicle through the password, and then may let the user, Thomas, know the matched password.

Figure 9:
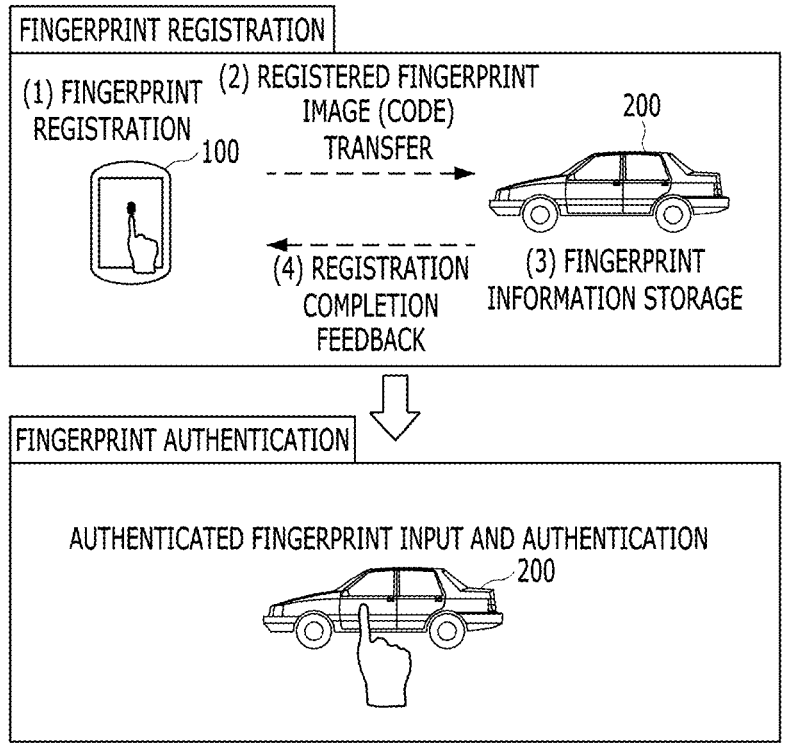
FIGS. 9 and 10 are views illustrating a biometric information authentication scheme according to embodiments of the present disclosure.
Figure 10:
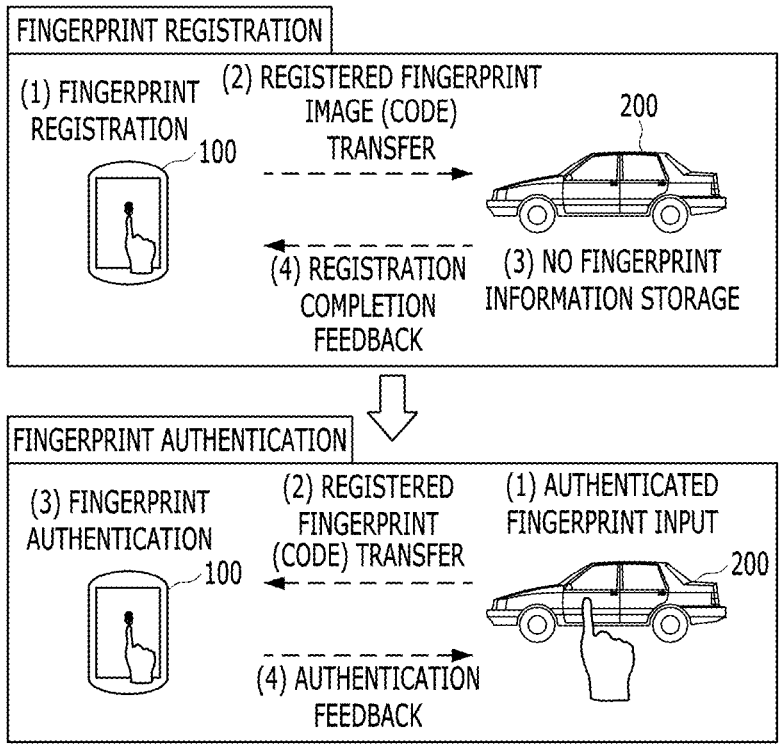

FIGS. 9 and 10 are views illustrating a biometric information authentication scheme.

As shown in FIGS. 9 and 10, upon matching user authentication information to a device 200, the authentication information matching device 100 may transmit the user authentication information to the matched device 200. Then, upon receiving a registration approval signal for the user authentication information from the matched device 200, the authentication information matching device 100 may register the user authentication information.

In this example, when transmitting the user authentication information to the matched device 200, the authentication information matching device 100 may perform a communication connection with the matched device 200. The authentication information matching device 100 may transmit the user authentication information to the matched device 200 upon being communication-connected with the matched device 200.

For example, the authentication information matching device 100 may perform the communication connection with the matched device 200 based on local-area communication including at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) communication.

Then, as shown in FIG. 9, upon receiving the user authentication information from the authentication information matching device 100, the matched device 200 may store the user authentication information and transmit the registration approval signal for the user authentication information to the authentication information matching device 100.

In this example, if user information is input, the matched device 200 may perform authentication for the input user information based on the stored user authentication information.

In another case, as in FIG. 10, upon receiving the user authentication information from the authentication information matching device 100, the matched device 200 may transmit the registration approval signal for the user authentication information to the authentication information matching device 100 without storing the user authentication information.

In this example, if user information is input, the matched device 200 may transmit the user information to the authentication information matching device 100 and receive an authentication result for the user information from the authentication information matching device 100.

For example, as in FIG. 9, a user registers a fingerprint (biometric information) using an external device such as a smart phone.

Then, the external device encodes an image of the fingerprint and transfers the resulting code data to a vehicle.

The vehicle stores the fingerprint data, compares fingerprint data input by the user with the stored fingerprint data and then performs authentication.

Registering the fingerprint using the external device may be included in a method of directly storing fingerprint information in the vehicle as in FIG. 9 and in a method of storing the fingerprint information through the external device and a server as in FIG. 10.

In the case where the fingerprint information is directly registered in the vehicle as in FIG. 9, a local-area communication technique such as Wi-Fi or Bluetooth (BT) may be employed.

In this case, there is an advantage since a separate external storage unit is not required because the fingerprint information is stored in the vehicle.

Alternatively, in the case where the fingerprint data of the user is input to a fingerprint sensor in the vehicle when the external device is connected to the vehicle through local-area communication as in FIG. 10, the fingerprint data is transmitted to the external device through the local-area communication and is then authenticated by the external device. Then, the feedback is sent to the vehicle and linked to a function of the vehicle, so that the function is executed.

In this case, because the fingerprint information is stored not in the vehicle but externally of the vehicle, the user may authenticate self-information with respect to a vehicle not owned by himself, such as a shared car or a rental car.

In this example, biometric information may be encrypted and security-verified for every authentication.

On the other hand, the authentication information matching device 100 of the present disclosure may store security level information by the devices. The authentication information matching device 100 may select and process any one of: a first scheme of transmitting user authentication information to the device 200 as shown in FIG. 9; and a second scheme of transmitting an authentication process result for user information received from the device 200 to the device 200 as shown in FIG. 10, such that the device 200 determines a user access authority determination entity (authentication information matching device or device) based on the security level information.

Figure 11:
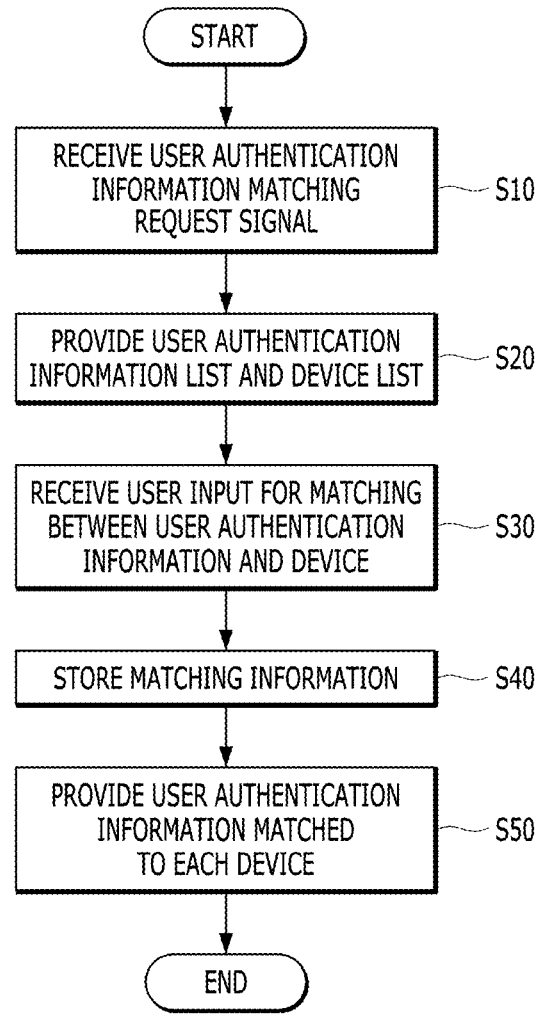
FIGS. 11 and 12 are flowcharts illustrating a heterogeneous device authentication method according to one embodiment of the present disclosure.
Figure 12:
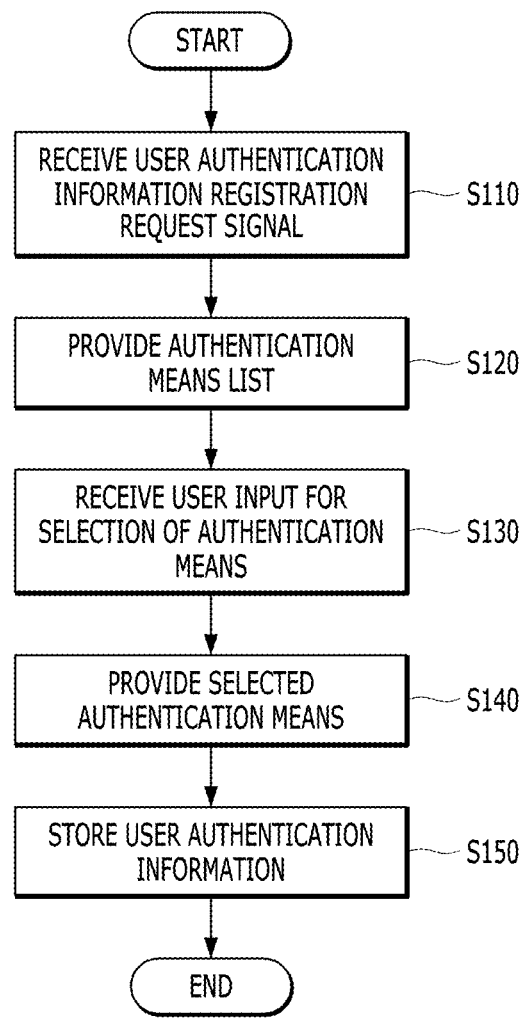

FIGS. 11 and 12 are flowcharts illustrating a heterogeneous device authentication method according to one embodiment of the present disclosure.

FIG. 11 is a flowchart illustrating a user authentication information matching process. FIG. 12 is a flowchart illustrating a user authentication information registration process.

As shown in FIG. 11, the authentication information matching device may receive a user authentication information matching request signal from a user (S10).

Upon receiving the user authentication information matching request signal, the authentication information matching device may provide a user authentication information matching window including a prestored user authentication information list and a communication-connected device list (S20).

In this example, the communication-connected device list may provide a plurality of communication-connected device items classified according to types. The communication-connected device list may also be referred to as the heterogeneous device list or the device list below.

In addition, the device list may further provide at least one function item corresponding to each device item.

Next, the authentication information matching device may receive a user input for matching user authentication information selected from the user authentication information list and a device selected from the device list (S30).

Upon receiving the user input, the authentication information matching device may match the selected user authentication information to the selected device based on the user input and store the resulting matching information (S40).

In addition, upon receiving a user input for an additional matching condition request, the authentication information matching device may provide an additional matching condition list based on the user input. Then, upon receiving a user input for matching between an additional matching condition item included in the additional matching condition list and a device item included in the device list, the authentication information matching device may additionally match an additional matching condition of the additional matching condition item to a device of the device item based on the user input and store the resulting additional matching information.

In this example, the additional matching condition list may include at least one of a time item or a place item.

Then, the authentication information matching device may provide user authentication information matched to each of the heterogeneous devices based on the matching information such that the heterogeneous devices perform user authentication (S50).

In this example, when matching the selected user authentication information to the selected device and storing the resulting matching information, the authentication information matching device may transmit the user authentication information to the matched device. Then, upon receiving a registration approval signal for the user authentication information from the matched device, the authentication information matching device may register the user authentication information.

On the other hand, upon receiving the user authentication information from the authentication information matching device, the matched device may store the user authentication information.

Then, the matched device may transmit the registration approval signal for the user authentication information to the authentication information matching device.

Then, when user information is input, the matched device may perform authentication for the input user information based on the prestored user authentication information.

Alternatively, upon receiving the user authentication information from the authentication information matching device, the matched device may transmit the registration approval signal for the user authentication information to the authentication information matching device.

Then, when user information is input, the matched device may transmit the input user information to the authentication information matching device and receive an authentication result for the user information from the authentication information matching device.

In addition, as shown in FIG. 12, the authentication information matching device may receive a user authentication information registration request signal from the user (S110).

Upon receiving the user authentication information registration request signal, the authentication information matching device may provide an authentication means list (S120).

In this example, the authentication means list may include a biometric authentication means item and a user information authentication means item.

Then, the authentication information matching device may receive a user input for selection of authentication means from the authentication means list (S130).

Upon receiving the user input, the authentication information matching device may provide the selected authentication means (S140).

Then, the authentication information matching device may store user authentication information input through the selected authentication means (S150).

As stated above, according to the present disclosure, user authentication information selected from among a plurality of user authentication information is matched to a device selected from among a plurality of heterogeneous devices. The heterogeneous devices perform user authentication based on the resulting matching information. Therefore, it may be possible not only to authenticate the heterogeneous devices efficiently, but also to authenticate the heterogeneous devices in various manners according to user environments.

Further, according to the present disclosure, a user may perform authentication according to a given situation through a simple UI manipulation, thereby making it possible to provide security and convenience together.

In addition, the present disclosure may provide a computer-readable recording medium for storing a program for execution of the heterogeneous device authentication method of the heterogeneous device authentication system, which may execute the processes included in the heterogeneous device authentication method.

The above-described heterogeneous device authentication method of the present disclosure may be implemented as computer-readable code stored on the program storage medium. The computer-readable code may be executed by a processor. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random-access memory (RAM), a compact disc read-only memory (CD-ROM), a magnetic tape, a floppy disk, and an optical data storage device.

As is apparent from the above description, in a heterogeneous device authentication system and a heterogeneous device authentication method thereof according to at least one embodiment of the present disclosure, user authentication information selected from among a plurality of user authentication information is matched to a device selected from among a plurality of heterogeneous devices and the heterogeneous devices perform user authentication based on the resulting matching information. Thereby, it may be possible not only to authenticate the heterogeneous devices efficiently, but also to authenticate the heterogeneous devices in various manners according to user environments.

Further, a user may perform authentication according to a given situation through a simple UI manipulation, thereby making it possible to provide security and convenience together.

It should be appreciated by those of ordinary skill in the art that the effects achievable through the present disclosure are not limited to those that have been particularly described hereinabove and that other effects of the present disclosure should be more clearly understood from the above detailed description.

The above detailed description is not to be construed as limiting the present disclosure in any aspect but is to be considered by way of example. The scope of the present disclosure should be determined by reasonable interpretation of the accompanying claims. All equivalent modifications made without departing from the scope of the present disclosure should be understood to be included in the following claims.

What is claimed is:

1. A heterogeneous device authentication system comprising an authentication information matching device communication-connected with a plurality of heterogeneous devices and configured to match a plurality of user authentication information of different authentication means to the plurality of heterogeneous devices,
    wherein the plurality of heterogeneous devices includes a device configured to provide user authentication information and a device configured to perform an authentication using the provided user authentication information,
    wherein the authentication information matching device comprises:
        a communication unit communication-connected between the device configured to provide the user authentication information and the device configured to perform the authentication; and
        a processor configured to match user authentication information selected from among the plurality of user authentication information to a device selected from among the plurality of heterogeneous devices based on a user input, store resulting matching information, and provide the matched user authentication information to each of the plurality of heterogeneous devices based on the resulting matching information such that the plurality of heterogeneous devices perform the authentication,
    wherein the device configured to provide the user authentication information provides user authentication information to the authentication information matching device,
    wherein the authentication information matching device transmits the matched user authentication information to the device configured to perform the authentication through the communication unit, and
    wherein the device configured to perform the authentication stores the matched user authentication information for user registration and performs the authentication using the stored user authentication information.

2. The heterogeneous device authentication system according to claim 1, wherein the authentication information matching device comprises biometric authentication means and user information authentication means.

3. The heterogeneous device authentication system according to claim 1, wherein the authentication information matching device provides an authentication means list upon receiving a user authentication information registration request signal, and, upon receiving a user input for selection of authentication means from the authentication means list, provides a selected authentication means and stores user authentication information input through the selected authentication means.

4. The heterogeneous device authentication system according to claim 1, wherein the authentication information matching device provides a prestored user authentication information list and a communication-connected device list upon receiving a user authentication information matching request signal, and, upon receiving a user input for matching between user authentication information selected from the user authentication information list and a device selected from the communication-connected device list, matches the selected user authentication information to the selected device from the communication-connected device list based on the user input and stores the resulting matching information.

5. The heterogeneous device authentication system according to claim 4, wherein the authentication information matching device provides an additional matching condition list upon receiving a user input for an additional matching condition request when storing the resulting matching information, and
  wherein, upon receiving a user input for matching between an additional matching condition item included in the additional matching condition list and a device item included in the communication-connected device list, the authentication information matching device additionally matches an additional matching condition of the additional matching condition item to a device of the device item based on the user input and stores resulting additional matching information.

6. The heterogeneous device authentication system according to claim 1, wherein the authentication information matching device matches the selected user authentication information to the selected device from among the plurality of heterogeneous devices based on at least one of device information or current situation information and stores the resulting matching information as initial matching information set as a default.

7. The heterogeneous device authentication system according to claim 1, wherein the authentication information matching device, when storing the resulting matching information, encodes an image and stores resulting code data, if the selected user authentication information is the image.

8. The heterogeneous device authentication system according to claim 1, wherein the authentication information matching device further comprises:
  an input unit configured to input the user authentication information; and
  a display screen configured to display a user authentication information matching window,
  wherein the display screen is controlled to display the user authentication information matching window, upon the authentication information matching device receiving a user authentication information matching request signal, and
  wherein, upon receiving a user input for matching between the input user authentication information and a device from the user authentication information matching window, the authentication information matching device matches the input user authentication information to the device based on the user input, stores the resulting matching information, and provides the matched user authentication information to each of the heterogeneous devices based on the resulting matching information such that the plurality of heterogeneous devices perform the authentication.

9. The heterogeneous device authentication system according to claim 8, wherein the authentication information matching device further comprises a storage unit configured to store the user authentication information input from the input unit and the resulting matching information between the input user authentication information and the selected device of the plurality of the heterogeneous devices.

10. The heterogeneous device authentication system according to claim 8, wherein the authentication information matching device stores the user authentication information input from the input unit and the resulting matching information between the user input authentication information and the selected device of the plurality of the heterogeneous devices in an external server.

11. The heterogeneous device authentication system according to claim 8, wherein the input unit comprises biometric authentication means and user information authentication means.

12. The heterogeneous device authentication system according to claim 8, wherein the display screen is controlled to display an authentication means list window, upon the authentication information matching device receiving a user authentication information registration request signal, and
  wherein, upon receiving a user input for selection of authentication means from the authentication means list window, the authentication information matching device provides a selected authentication means and stores the user authentication information input through the input unit corresponding to the selected authentication means.

13. The heterogeneous device authentication system according to claim 1, wherein each of the plurality of heterogeneous devices comprises:
  a communication unit communication-connected with the authentication information matching device;
  an input unit configured to input user authentication information; and
  a processor configured to, when the user authentication information is input from the input unit, determine whether a user has access authority to a corresponding one of the devices, by authenticating the input user authentication information based on the matched user authentication information received from the authentication information matching device.

14. The heterogeneous device authentication system according to claim 13, wherein each of the heterogeneous devices further comprises a storage unit configured to store the user authentication information received from the authentication information matching device.

15. The heterogeneous device authentication system according to claim 1, wherein each of the plurality of heterogeneous devices comprises:
  a communication unit communication-connected with the authentication information matching device;
  an input unit configured to input user authentication information; and
  a processor configured to, when the user authentication information is input from the input unit, transmit the input user authentication information to the authentication information matching device, and determine whether a user has access authority to a corresponding one of the devices, based on an authentication process result received from the authentication information matching device.

16. The heterogeneous device authentication system according to claim 1, wherein the authentication information matching device stores security level information by devices, and selects any one of a first scheme of transmitting user authentication information to each of the heterogeneous devices and a second scheme of transmitting an authentication process result for user authentication information received from each of the plurality of heterogeneous devices to each of the plurality of heterogeneous devices, such that each of the plurality of heterogeneous devices determines a user access authority determination entity based on the security level information.

17. A heterogeneous device authentication method of a heterogeneous device authentication system comprising an authentication information matching device communication-connected with a plurality of heterogeneous devices, the method comprising:
  receiving a user authentication information matching request signal by the authentication information matching device;
  providing, by the authentication information matching device, a prestored user authentication information list and a communication-connected device list upon receiving the user authentication information matching request signal;
  receiving, by the authentication information matching device, a user input for matching between user authentication information selected from the user authentication information list and a device selected from the communication-connected device list;
  matching, by the authentication information matching device, the selected user authentication information to the selected device from the communication-connected device list based on the user input upon receiving the user input, and storing resulting matching information;
  providing, by the authentication information matching device, the matched user authentication information to each of the plurality of heterogeneous devices based on the resulting matching information such that the plurality of heterogeneous devices performs an authentication, wherein the plurality of heterogeneous devices includes a device for providing configured to provide user authentication information and a device for performing configured to perform authentication using the provided user authentication information;
  providing, by the device configured to provide the user authentication information, user authentication information to the authentication information matching device;
  transmitting, by the authentication information matching device, the matched user authentication information to the device configured to perform the authentication through a communication unit;
  storing, by the device configured to perform the authentication, the matched user authentication information for user registration; and
  performing, by the device configured to perform the authentication, the authentication using the stored user authentication information.

18. The heterogeneous device authentication method according to claim 17, further comprising:
  receiving a user authentication information registration request signal by the authentication information matching device;
  providing, by the authentication information matching device, an authentication means list upon receiving the user authentication information registration request signal;
  receiving, by the authentication information matching device, a user input for selection of authentication means from the authentication means list;
  providing, by the authentication information matching device, the selected authentication means upon receiving the user input; and
  storing, by the authentication information matching device, storing user authentication information input through the selected authentication means.

19. The heterogeneous device authentication method according to claim 17, wherein the storing the resulting matching information comprises:
  receiving a user input for an additional matching condition request;
  providing an additional matching condition list based on the user input;
  receiving a user input for matching between an additional matching condition item included in the additional matching condition list and a device item included in the communication-connected device list; and
  additionally matching an additional matching condition of the additional matching condition item to a device of the device item based on the user input and storing resulting additional matching information.

20. The heterogeneous device authentication method according to claim 17, wherein the storing the resulting matching information comprises:
  transmitting the selected user authentication information to the matched device when matching the selected user authentication information to the selected device and storing the resulting matching information; and
  registering the matched user authentication information upon receiving a registration approval signal for the matched user authentication information from the matched device.

21. The heterogeneous device authentication method according to claim 17, further comprising:
  receiving the user authentication information from the authentication information matching device by the matched device;
  storing the user authentication information by the matched device;
  transmitting a registration approval signal for the user authentication information to the authentication information matching device by the matched device;
  receiving input user authentication information by the matched device; and
  performing, by the matched device, the authentication for the input user authentication information based on the stored user authentication information.

22. The heterogeneous device authentication method according to claim 17, further comprising:
  receiving the user authentication information from the authentication information matching device by the matched device;
  transmitting a registration approval signal for the user authentication information to the authentication information matching device by the matched device;
  receiving input user authentication information by the matched device;

transmitting the input user authentication information to the authentication information matching device by the matched device; and receiving an authentication result for the input user authentication information from the authentication information matching device by the matched device.

23. A non-transitory computer-readable recording medium containing a program performing the heterogenous device authentication method according to claim 17.

* * * * *

UNITED STATES PATENT AND TRADEMARK OFFICE
CERTIFICATE OF CORRECTION

PATENT NO. : 11,695,762 B2
APPLICATION NO. : 16/809207
DATED : July 4, 2023
INVENTOR(S) : Sung Un Kim Page 1 of 1

It is certified that error appears in the above-identified patent and that said Letters Patent is hereby corrected as shown below:

In the Claims

Column 21, Claim 17:
Line 48, please delete "for providing"
Lines 49-50, please delete "for performing"

Signed and Sealed this
Twenty-second Day of August, 2023

Katherine Kelly Vidal
*Director of the United States Patent and Trademark Office*